United States Patent
Butler et al.

(10) Patent No.: US 7,779,122 B2
(45) Date of Patent: *Aug. 17, 2010

(54) AUTOMATICALLY IDENTIFYING AN OPTIMAL SET OF ATTRIBUTES TO FACILITATE GENERATING BEST PRACTICES FOR CONFIGURING A NETWORKED SYSTEM

(75) Inventors: Eric Kevin Butler, San Jose, CA (US); Ramani Ranjan Routray, San Jose, CA (US); Prasenjit Sarkar, San Jose, CA (US); Chung-hao Tan, San Jose, CA (US); Kiyoung Yang, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 12/127,916

(22) Filed: May 28, 2008

(65) Prior Publication Data
US 2009/0187518 A1    Jul. 23, 2009

Related U.S. Application Data

(63) Continuation of application No. 12/017,126, filed on Jan. 21, 2008, now Pat. No. 7,685,277.

(51) Int. Cl.
*G06F 15/16* (2006.01)
*G06F 7/00* (2006.01)
(52) U.S. Cl. ............... 709/224; 709/226; 709/228; 455/456.1; 382/240
(58) Field of Classification Search ............ 709/224, 709/226, 228, 231; 455/456.1; 382/240
See application file for complete search history.

(56) References Cited

U.S. PATENT DOCUMENTS

| | | | |
|---|---|---|---|
| 5,819,215 | A | 10/1998 | Dobson et al. |
| 6,119,112 | A | 9/2000 | Bush |
| 6,658,396 | B1 | 12/2003 | Tang et al. |
| 6,671,818 | B1 | 12/2003 | Mikurak |
| 6,952,688 | B1 | 10/2005 | Goldman et al. |

(Continued)

OTHER PUBLICATIONS

Notice of Allowance (Mail Date Nov. 5, 2009) for U.S. Appl. No. 12/017,126, filed Jan. 21, 2008; Confirmation No. 5791.

(Continued)

*Primary Examiner*—Khanh Q Dinh
(74) *Attorney, Agent, or Firm*—Schmeiser, Olsen & Watts

(57) ABSTRACT

A method and system for automatically identifying an optimal set of attributes of entities included in a networked system. Entity types are ranked based on information gain. A first classification accuracy relative to a first entity type is determined. The first entity type is the top-ranked entity type or a first aggregate entity type. A second entity type is selected base on the ranking. A database join of a first set of attributes associated with the first entity type and a second set of attributes associated with the second entity type is performed. A second classification accuracy relative to a second aggregate entity type generated by the join is determined. In response to determining that the second classification accuracy is not greater than the first classification accuracy, an optimal set of attributes contributing to a problem in the networked system is identified as the first set of attributes.

20 Claims, 5 Drawing Sheets

U.S. PATENT DOCUMENTS

| | | | |
|---|---|---|---|
| 7,088,854 | B2 | 8/2006 | Cotman et al. |
| 7,130,807 | B1 | 10/2006 | Mikurak |
| 7,324,979 | B2 | 1/2008 | Butler et al. |
| 7,577,736 | B1 * | 8/2009 | Ovenden .................... 709/224 |
| 2004/0198386 | A1 * | 10/2004 | Dupray .................... 455/456.1 |
| 2005/0049983 | A1 | 3/2005 | Butler et al. |
| 2007/0071337 | A1 | 3/2007 | Thomas |
| 2007/0261072 | A1 * | 11/2007 | Boulet et al. .................. 725/14 |
| 2007/0287473 | A1 * | 12/2007 | Dupray .................... 455/456.1 |

OTHER PUBLICATIONS

Kalashnikov et al.; Domain-Independent Data Cleaning via Analysis of Entity-Relationship Graph; ACM Transactions on Database Systems, vol. 31, No. 2, Jun. 2006; pp. 716-767.

Bhattacharya et al.; Collective Entity Resolution in Relational Data; ACM Transactions on Knowledge Discovery from Data, vol. 1, No. 1, Article 5, Publication date: Mar. 2007; 36 pages.

* cited by examiner

AUTOMATICALLY IDENTIFYING AN OPTIMAL SET OF ATTRIBUTES TO FACILITATE GENERATING BEST PRACTICES FOR CONFIGURING A NETWORKED SYSTEM

This application is a continuation application claiming priority to Ser. No. 12/017,126, filed Jan. 21, 2008.

FIELD OF THE INVENTION

The present invention relates to configuring a networked system, and more particularly to a technique for automatically identifying an optimal set of attributes to facilitate generating best practices for configuring a networked system.

BACKGROUND OF THE INVENTION

Adherence to best practices is essential for successful configuration and deployment of complex networked systems. In such scenarios, experts rely on experience as well as repositories of best practice guidelines to proactively prevent any configuration errors while deploying a networked system in a data center. The reasons for such reliance on experience and repositories of best practice guidelines are listed below. First, the entities in a data center are associated via complex physical and logical relationships which may number an order of magnitude more than the entities themselves. Second, the diagnosis of any problem requires a huge amount of data to be collected, filtered, and correlated from various sources over different periods of time. Third, most data center deployments are not integrated enough to present a single, usable text or graphical interface to navigate through the problem diagnosis process. Instead, a system administrator must correlate data across multiple point tools using techniques that are tedious, time-consuming and prone to errors. Fourth, the technology in a data center is continually evolving primarily due to the need for product differentiation. This hampers the ability of system administrators to diagnose configuration problems because their expertise lags behind the state of the art. Finally, the standardization process that dictates inter-vendor interoperability may be immature and continuously evolving leading to hard-to-diagnose configuration errors. Conventionally, best practices are generated using a costly manual process. In most system domains, conventional best practice generation requires a large team to analyze large sets of configuration data using rudimentary tools to generate the best practices for that system domain. In the case of storage subsystems, best practices may reduce the time required to resolve configuration errors, but the generation of such best practices may be costly and time-consuming (e.g., requiring 20 man-years of data gathering and analysis to derive the benefit of reducing the time required to resolve configuration errors from two weeks to two days). Thus, there exists a need to overcome at least one of the preceding deficiencies and limitations of the related art.

SUMMARY OF THE INVENTION

The invention provides a computer-implemented method of automatically identifying an optimal set of attributes of entities to facilitate generating best practices for configuring a networked system.

The method comprises:

ranking, by a computing system and based on a plurality of information gain values, a plurality of entity types of a plurality of entities included in the networked system;

determining, by the computing system and subsequent to the ranking of the entity types, a first classification accuracy relative to a first entity type, wherein the first entity type is a highest ranked entity type of the plurality of entity types based on the ranking or is a first aggregate entity type associated with two or more entity types of the plurality of entity types;

selecting, by the computing system and subsequent to the determining the first measurement, a second entity type of the plurality of entity types, wherein the selecting is based on the ranking of the entity types;

performing, by the computing system, a database join operation on a first set of one or more attributes of one or more entities of the first entity type and a second set of one or more attributes of one or more entities of the second entity type, wherein a result of the performing is a second aggregate entity type;

determining, by the computing system, a second classification accuracy relative to the second aggregate entity type;

determining, by the computing system, that the second classification accuracy is less than or equal to the first classification accuracy;

identifying, by the computing system and in response to determining that the second measurement is less than or equal to the first measurement, an optimal set of one or more attributes as the first set of one or more attributes, wherein the optimal set contributes to a problem associated with the networked system; and storing the optimal set in a data repository coupled to the computing system.

A system and computer program product corresponding to the above-summarized method are also described and claimed herein.

Advantageously, the present invention provides a systematic approach for determining the purest subset of entities, attributes and associations that contribute to a networked system configuration error, thereby providing effective dimensionality reduction. Further, the purest subset of entities, attributes and associations facilitates an efficient determination of best practices for configuring the networked system.

DETAILED DESCRIPTION OF THE INVENTION

Overview

Provided is a systematic way to gather all the data needed to analyze a problem associated with a configuration of a networked system (e.g., a storage area network problem) and to automatically generate best practices for configuring the networked system. The technique disclosed herein automatically generates an optimal set of entities, attributes, and associations by using an information gain-based ranking of entity types and a classification approach that provide effective dimensionality reduction. The optimal set is utilized to generate the best practices. Rather than using an inefficient and time-consuming brute force approach in which all entities and associations are joined into a huge rectangular result set of rows and columns prior to the start of the classification procedure, the invention adds entities incrementally depending on an information gain metric. This approach can be compared to a graph that grows from a node using edges to cover an optimal section of the graph. This optimal section of the graph then can be used for classification to yield the best practice. Based on experimentation, the algorithm of the invention shows that best practices can be generated using only 30% of the entities and associations.

Optimal Entity Attribute Set Identification System

Figure 1:
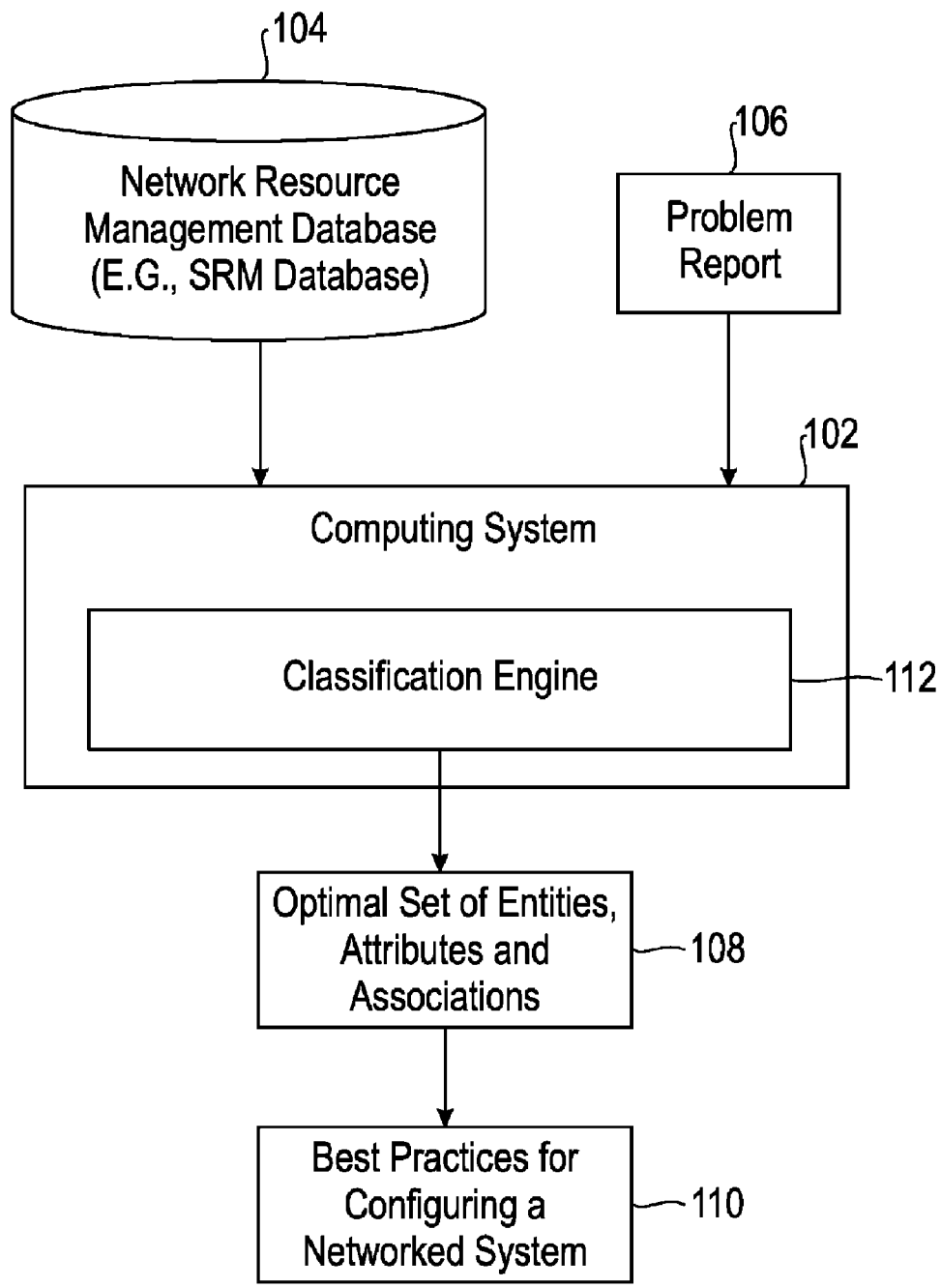
FIG. 1 is a block diagram of a system for automatically identifying an optimal set of entity attributes to facilitate generating best practices for configuring a networked system of entities.

FIG. 1 is a block diagram of a system for automatically identifying an optimal set of entity attributes to facilitate generating best practices for configuring a networked system of entities. System 100 includes a computing system 102, a network resource management database 104, a problem report 106, an optimal set of entities, associations, attributes, and attribute values 108, and best practices 110 for configuring a networked system (e.g., a data center) (not shown). Optimal set 108 is stored in a data repository (e.g., a database table) (not shown) coupled to computing system 102. Hereinafter, optimal set 108 is also referred to as an optimal set of entities, associations, and attributes. Hereinafter, the networked system whose configuration is associated with best practices 110 is also referred to simply as the networked system.

The networked system may include multiple networks, such as one or more storage area networks (SANs), one or more local area networks (LANs), and/or one or more other computer networks of other varieties. A configuration of the networked system includes multiple entities. As used herein, an entity is defined as an object in a networked system, such as a host server, a switch, or a storage subsystem.

In one embodiment, the networked system includes a SAN, which includes a collection of entities, such as one or more computers (i.e., host servers), switches, and storage subsystems. In one embodiment, the networked system includes a LAN, which includes host servers, client systems, switches, routers, hubs, and the like. The networked system may include computing system 102.

Each entity in a networked system may have multiple attributes and associations. As used herein, an attribute is defined as a property or characteristic of an entity of a networked system. As used herein, an association is defined as a description of a relationship between one entity and another entity in a networked system.

Computing system 102 includes a classification engine 112 and a software-based best practices generator (not shown). Classification engine 112 includes the software for automatically identifying optimal set 108 of entities, attributes, and associations to facilitate generating best practices for configuring the networked system so as to avoid a problem associated with the networked system configuration. In one embodiment, optimal set 108 is received by the best practices generator, which then generates best practices 110 by forming rules that avoid the attributes and/or attribute values in the optimal set 108.

Generating best practices 110 for configuring a networked system refers to a predictive mechanism that determines guidelines based on a minimal combination of entities with specific attribute or associations that should be followed so as to avoid a recurrence of a networked system configuration problem. Best practices establish rules, which if followed, avoid configurations of a networked system that result in a specific problem or class of problems.

Computing system 102 may be any type of computer known in the art, such as a server computing system, a workstation, a personal computer, or the like, and may interface to a SAN infrastructure via a host bus adapter (HBA), where the SAN infrastructure is included in the networked system. Computing system 102 may also be coupled to a LAN included in the networked system.

In one embodiment, computing system 102 executes management software, such as a network resource management (NRM) tool (not shown) that supports administrative functions including configuring the entities of the networked system. The NRM tool may also support tracking problems associated with the configuration of the networked system and storing the tracked problems and networked system configuration data to one or more databases, such as network resource management database 104 and problem report 106. The network resource management database 104 is, for example, a Storage Resource Management (SRM) database.

The networked system and the entities, attributes and associations related thereto are further described in U.S. patent application Ser. No. 11/693,223, entitled METHODS, SYSTEMS, AND COMPUTER PROGRAM PRODUCTS FOR AUTOMATICALLY GENERATING BEST PRACTICES FOR CONFIGURING A NETWORKED SYSTEM and filed Mar. 29, 2007, and which is hereby incorporated herein by reference in its entirety.

Optimal Entity Attribute Set Identification Process

Figure 2:
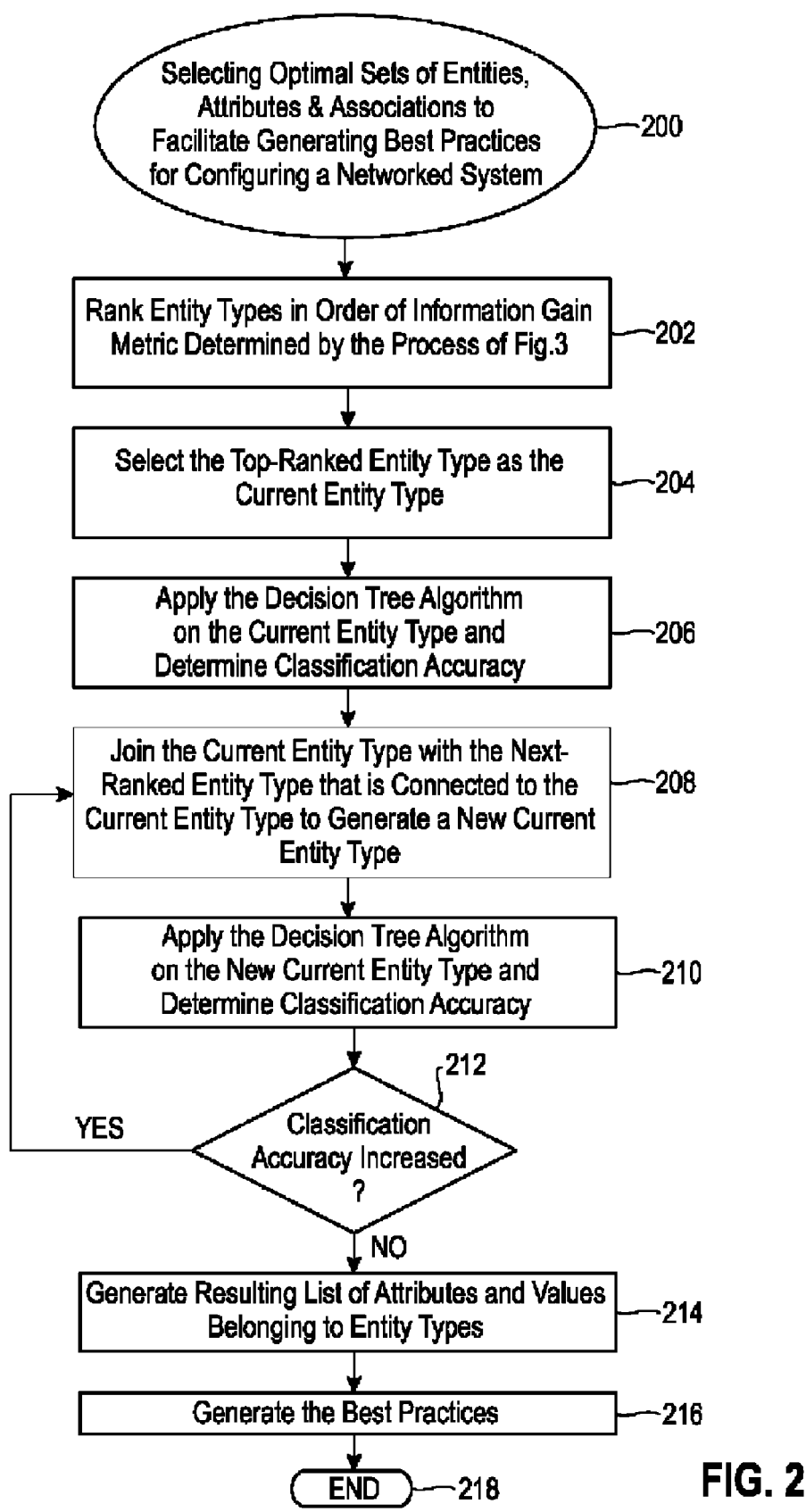
FIG. 2 is a flow diagram of a process of automatically identifying an optimal set of attributes to facilitate generating best practices for configuring a networked system of entities, where the process is implemented by the system of FIG. 1.

FIG. 2 is a flow diagram of a process of automatically identifying an optimal set of entities to facilitate generating best practices for configuring a networked system, where the process is implemented by the system of FIG. 1. The process of automatically identifying an optimal set of entities begins at step 200. Prior to step 202, a best practices generator running on computing system 102 (see FIG. 1) identifies a problem associated with a configuration of a networked system. The aforementioned problem is also referred to herein as the networked system configuration problem. The identification of the networked system configuration problem utilizes problem report 106 (see FIG. 1) and networked system configuration data stored in network resource management database 104 (see FIG. 1). The networked system configuration data may include information related to entities, associations that indicate a relationship between entities and attributes of entities, where the entities, associations, and attributes are associated with one or more networked systems. After identifying the networked system configuration problem, the best practices generator of computing system 102 (see FIG. 1) determines a set of problematic entities that includes one or more entities reporting the networked system configuration problem. The determination of the set of problematic entities may utilize an access of data in, for example, a data warehouse (not shown). The set of problematic entities may include various entity types, such as, for example, servers, HBAs, switches, and storage subsystems. The set of problematic entities may further include entities in multiple networked systems that have the same networked system configuration problem.

In step 202, classification engine 112 (see FIG. 1) ranks each entity type of a plurality of entity types, thereby determining a plurality of rankings. Each of the entity types categorizes one or more entities included in the configuration of the networked system. The rankings determined in step 202 are in an order provided by an information gain metric determined for each of the entity types. Thus, step 202 determines information gain-based ranks of the entity types. A rank determined in step 202 indicates a likelihood that an entity contributes to the networked system configuration problem (i.e., a higher rank indicates that the entity associated with the rank is more likely to contribute to the networked system configuration problem). The process of determining the information gain for each entity type is described below relative to FIG. 3. Information relative to the networked system configuration problem is included in problem report 106 (see FIG. 1) and network resource management database 104 (see FIG. 1) and is received by classification engine 112 (see FIG. 1). In this section, any reference to "rank" or a variation thereof refers to a rank determined in step 202.

Steps 204-214 provide a classification process that selects entity types based on the ranking provided in step 202, classifies the selected entity types and identifies a purest (i.e., optimal) subset of attributes and attribute values associated with the selected entity types, where the optimal subset includes attributes and attribute values that are contributors to the networked system configuration problem. In one embodiment, decision trees are employed to aid in the classification process. A decision tree describes a tree structure wherein leaves represent classifications and branches represent conjunctions of features that lead to the aforementioned classifications. A decision tree can be learned by splitting the source data set into subsets based on an attribute value test. This process of splitting the data set is repeated on each derived subset in a recursive manner. The recursion is completed when splitting is either non-feasible or a singular classification can be applied to each element of the derived subset. A decision tree typically takes a single entity type as input, whereas the present invention addresses environments having multiple types of entities with disjoint attribute sets. Multiple entity types may be combined into an aggregate entity type, which is then input into a decision tree-based classification process.

In step 204, using the ranks provided by step 202, classification engine 112 (see FIG. 1) selects the top-ranked entity type as a current entity type. That is, the top-ranked entity type has a rank provided by the ranking in step 202 that is higher than any other rank provided by step 202.

In step 206, classification engine 112 (see FIG. 1) applies a decision tree algorithm (e.g., c4.5 algorithm) on attributes and the attributes' values (a.k.a. attribute values), where the attributes are characteristics of entities of the current entity type. In step 206, classification engine 112 (see FIG. 1) uses the result of the decision tree algorithm to identify a subset of one or more attributes and attribute values. The one or more attributes and attribute values in the identified subset indicate attributes and attribute values that contribute to the networked system configuration problem. Step 206 also includes the classification engine 112 (see FIG. 1) determining a current classification accuracy associated with the identified subset of attributes and attribute values. That is, classification engine 112 (see FIG. 1) directly or indirectly computes a current classification accuracy. As used herein, classification accuracy is a value indicating the accuracy of a classification of attributes and attribute values as contributing to a networked system configuration problem. The classification accuracy may be determined by comparing a particular attribute or attribute value to members of each subset of source data as the decision tree is created or analyzed. In one embodiment, the result of the decision tree algorithm in step 206 cannot be used to identify attributes or attribute values that contribute to the networked system configuration problem if the classification accuracy is below a predetermined threshold.

In step 208, classification engine 112 (see FIG. 1) joins the current entity type and the next-ranked entity type that is connected to the current entity type in at least one data path included in the aforementioned configuration of the networked system. An aggregate entity type is generated as the result of the join in step 208. Furthermore, classification engine 112 (see FIG. 1) re-sets the current entity type as the aforementioned aggregate entity type (i.e., re-sets the current entity type to a new current entity type).

As used herein, joining a first entity type and a second entity type, such as the join performed in step 208, is defined as performing a database join (e.g., cross join or left outer join) of a first table and a second table, where the first table includes attribute values for entity instances of the first entity type and the second table includes attribute values for entity instances of the second entity type. The result of joining a first entity type and a second entity type is a joined table that includes the attribute values for entity instances of the first entity type and attribute values for entity instances of the second entity type. The entity instances of the joined table are instances of the aforementioned aggregate entity type.

Step 208 is part of a classification loop that includes steps 210 and step 212. In the first iteration of the classification loop, the next-ranked entity type in step 208 is the entity type having the second highest rank of the ranks determined in step 202. In an iteration of the classification loop that is subsequent to the aforementioned first iteration, the next-ranked entity type in step 208 is the entity type that has a rank determined in step 202 that is the next highest rank relative to the rank of the entity type that had been the next-ranked entity type in the most recent previous iteration of the classification loop.

In one embodiment, the database join performed in step 208 is selected to be a cross join or a left outer join based on semantic knowledge of collected or discovered data related to entities of the entity types being joined. As a first example, Storage Volume information stored about an entity is known to contain information about the encompassing entity Storage Subsystem because a Storage Volume cannot exist without the existence of a Storage Subsystem and such information is discovered in a particular order: first Storage Subsystem is discovered and then the Storage Volume. In this first example, a cross join of StorageVolume.SubsystemID=StorageSubsystem.ID is performed in step 208. As a second example, a Computer entity type and an HBA entity type are being joined, but there might be a certain computer entity without any HBA. In this second example, a left outer join of Computer and HBA is performed.

In step 210, classification engine 112 (see FIG. 1) applies the aforementioned decision tree algorithm on the current entity type (i.e., the new current entity type generated in step 208) on the attributes and attribute values of entities of the current entity type. Classification engine 112 (see FIG. 1) uses the result of the decision tree algorithm's application in step 210 to identify a subset of one or more attributes and attribute values associated with the current entity type, where the one or more attributes and attribute values in the subset contribute to the networked system configuration problem. The classification engine 112 (see FIG. 1) also determines a new current classification accuracy associated with the subset of one or more attributes and attribute values identified in step 210. Further, the classification engine 112 (see FIG. 1) re-sets the former current classification accuracy as the most recent previously determined classification accuracy. Again, the current classification accuracy may be determined by comparing a particular attribute or attribute value to members of each subset of source data as the decision tree is created or analyzed. In one embodiment, the result of the decision tree algorithm in step 210 cannot be used to identify attributes or attribute values that contribute to the networked system configuration problem if the classification accuracy is below a predetermined threshold.

If classification engine 112 (see FIG. 1) determines in step 212 that the current classification accuracy determined in step 210 is greater than the most recent previously determined classification accuracy (i.e., the classification accuracy determined in step 206 if step 212 is being performed in the first iteration of the classification loop or the classification accuracy determined in step 210 of the most recent previous iteration of the classification loop), then the process of FIG. 2 loops back to step 208 to start a next iteration of steps 208, 210 and 212.

Returning to step 212, if the classification engine 112 (see FIG. 1) determines that the current classification accuracy is not greater than the most recent previously determined classification accuracy, then in step 214, classification engine 112 (see FIG. 1) generates an optimal set of attributes and attribute values that are included in optimal set 108 (see FIG. 1). The attributes and attribute values of the optimal set generated in step 214 are associated with a set of entities and/or associations of the networked system. These associated entities and/or associations are automatically identified by the classification engine as being included in optimal set 108 (see FIG. 1). Again, the optimal set of entities, attributes, and associations 108 (see FIG. 1) are used to generate the best practices 110 (see FIG. 1) for avoiding the networked system configuration problem.

Any continuous value included in the attribute values associated with the aggregate entity type generated by step 208 is discretized (e.g., using a standard k-means discretization technique) prior to being included in the optimal set 108 (see FIG. 1). For example, the size of the main memory in a host computer is a continuous value. If the present invention is trying to ascertain the best practice of avoiding a Windows® 2000 computer with more than 4 GB of main memory while installing an Emulex® HBA of type 9002, then the continuous values of the main memory size are discretized.

In order to reduce the processing time of the classification process of FIG. 2, attributes that are not relevant to the classification process are eliminated prior to the generation of the optimal set in step 214. The relevance of each attribute to the classification process may be measured based on, for example, information gain and information gain ratio. For instance, attributes that have only one unique value are eliminated from the classification process because their information gain and information gain ratio are zero.

Also excluded from the optimal set generated in step 214 are primary key attributes because these attributes carry only implicit knowledge. In other words, the primary key attributes are used to uniquely identify only one instance of an entity and the primary key attributes do not carry any knowledge about the entity. Similarly, attributes with unique constraints are eliminated from the classification process.

Figure 3:
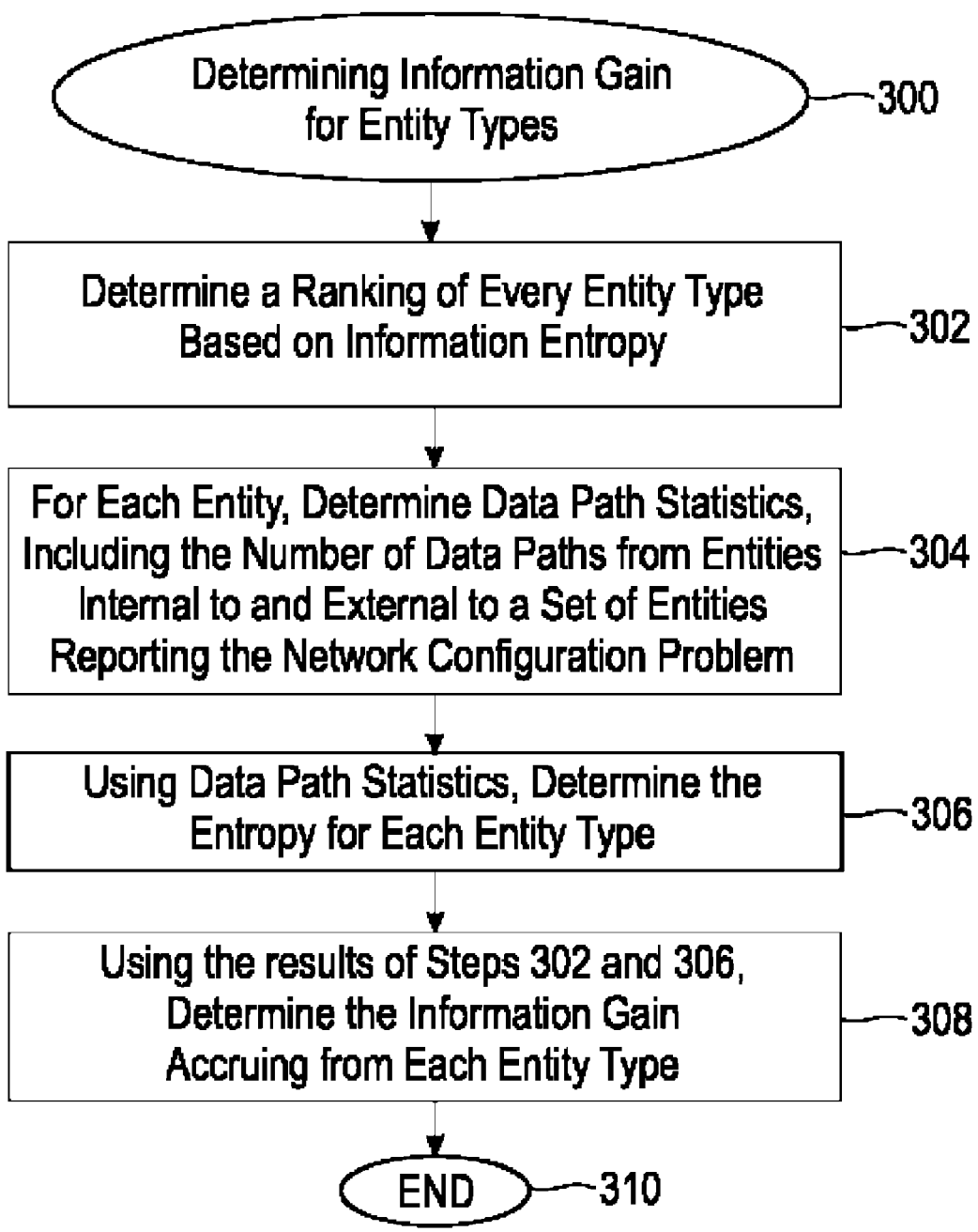
FIG. 3 is a flow diagram of a process determining information gain for entity types within the process of FIG. 2.

FIG. 3 is a flow diagram of a process determining information gain for entity types within the process of FIG. 2. The process for determining information gain for entity types begins at step 300. In step 302, classification engine 112 (see FIG. 1) determines a ranking of every entity type that categorizes entities included in the configuration of the networked system. The ranking determined in step 302 is based on an information entropy value computed for each of the entity types being ranked. As used herein, information entropy $H(x)$ of an event x is expressed formally below in equation (1), wherein $p(j)$ is the probability of an occurrence of outcome j of event x, and wherein n is the total number of possible outcomes of event x.

$$H(x) = \sum_{j=1}^{n} p(j) \log_2 \left(\frac{1}{p(j)}\right) \quad (1)$$

A data path between two entities is defined to be a list of association instances that may be used to perform a database join of the entities in question. Trivially, there exists a data path between an entity and itself through the null association. In step 304, classification engine 112 (see FIG. 1) determines data path statistics for each entity. The data path statistics determined in step 304 include the number of data paths from entities internal to and external to a set of entities E. The set of entities E represents the collection of entities reporting the networked system configuration problem. A true data path is defined as a data path to an entity within the set E and a false data path is defined as a data path to an entity outside the set E.

Data path statistics are used to define the entropy for an entity type T. In defining the entropy for entity type T, it is assumed that there are P true data paths and N false data paths associated with entity type T. Entropy for entity type T is defined formally by equation (2a). Instances of the entity type T divide the above-mentioned data paths into k partitions, each partition containing $P_i$ true data paths and $N_i$ false data paths, where i varies from 1 to k and where k>1. In step 306, classification engine 112 (see FIG. 1) determines the entropy for each entity type using data path statistics determined in step 304 (e.g., by using equation (2a)). Step 308 uses a variation of equation (2a) (i.e., equation (2b)) in a determination of the information gain of entity type T.

$$\text{Entropy } (P, N) = -\left(\frac{P}{P+N} \times \log_2 \frac{P}{P+N} + \frac{N}{P+N} \times \log_2 \frac{N}{P+N}\right) \quad (2a)$$

$$\text{Entropy } (P_i, N_i) = -\left(\frac{P_i}{P_i+N_i} \times \log_2 \frac{P_i}{P_i+N_i} + \frac{N_i}{P_i+N_i} \times \log_2 \frac{N_i}{P_i+N_i}\right) \quad (2b)$$

In step 308, classification engine 112 (see FIG. 1) uses the results of step 302 and step 306 to determine the information gain accruing from each entity type. Step 308 determines information gain accruing from an entity type T (i.e., Gain (T)) using, for example, equation (3), in which k, $P_i$ and $N_i$ are defined above relative to step 306 and Entropy($P_i,N_i$) is determined by, for example, equation (2b). The process of FIG. 3 ends at step 310.

$$\text{Gain } (T) = H(T) - \sum_{i=1}^{k} \frac{P_i + N_i}{P+N} \times \text{Entropy } (P_i, N_i) \quad (3)$$

The process of FIG. 3 is performed to determine an information gain value corresponding to each entity type of the plurality of entity types. The entity types are ranked (i.e., ordered) in step 202 (see FIG. 2) based on the magnitude of their corresponding information gain values that are determined in step 308.

Example

Figure 4:
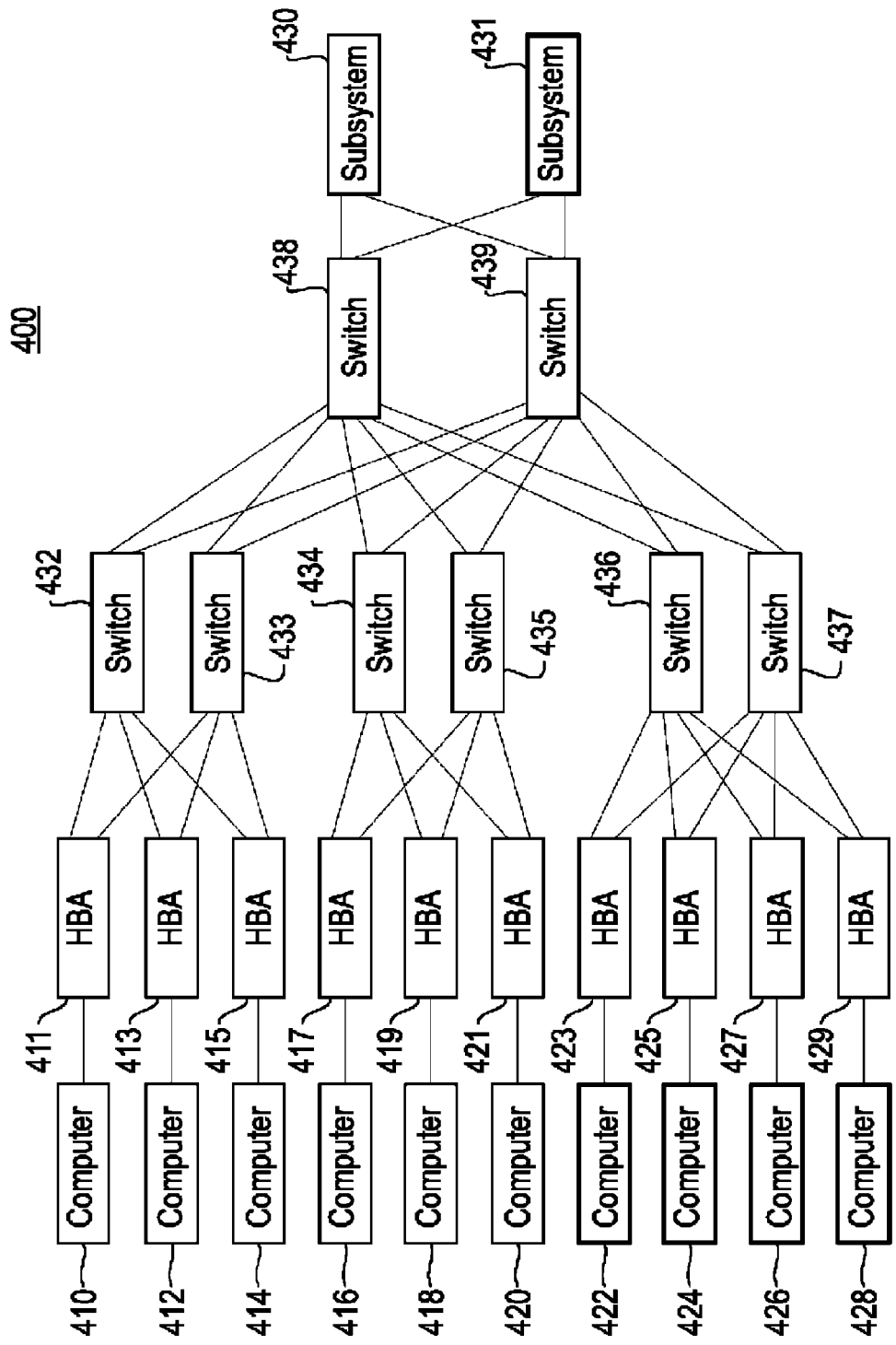
FIG. 4 is an exemplary configuration of a networked system illustrating the operation of the process of FIG. 2.

FIG. 4 is an exemplary SAN configuration illustrating the operation of the process of FIG. 2. In configuration 400, hosts (i.e., computers) 410, 412, 414, 416, 418, 420, 422, 424, 426 and 428 are respectively connected via HBAs 411, 413, 415, 417, 419, 421, 423, 425, 427 and 429 and two layers of switches to storage subsystems 430 and 431. The first layer of switches includes switches 432-437. Switches 432 and 433 are connected to HBAs 411, 413 and 415. Switches 434 and 435 are connected to HBAs 417, 419 and 421. Switches 436 and 437 are connected to HBAs 423, 425, 427 and 429. The second layer of switches includes switches 438 and 439. Each of switches 438 and 439 is connected to switches 432-437. In the example of this section, computers 422, 424, 426 and 428 have access problems with subsystem 431. Thus, the boldface outlines in FIG. 4 indicate faulty components of a SAN configuration problem. Furthermore, computers 414-428 have access rights to subsystem 431, whereas computers 410 and 412 do not have access rights to subsystem 431.

The operation of the process of FIG. 2 is shown by demonstrating how the information gain for the entity type Computer (i.e., Host) is calculated. For the entity type Computer, the data paths are divided into two partitions with identifiers (IDs) 1 and 2, as shown in Table 1.

TABLE 1

| ID | OSTYPE | OSVERSION |
|----|--------|-----------|
| 1 | Windows | 2000 |
| 2 | Linux | RedHat 2.4 |

For each partition in the entity type Computer, the numbers of true data paths and false data paths are determined (see step 304 of FIG. 3), as shown in the COUNT(*) column of Table 2. The LABEL column of Table 2 indicates whether the count in COUNT(*) is a number of true or false data paths. It should be noted that for partition 1, there is no false data path. In this example, the aforementioned set of entities E used to determine true data paths and false data paths includes the entire set of entities that have access rights and are connected to subsystem 431.

TABLE 2

| ID | OSTYPE | OSVERSION | LABEL | COUNT(*) |
|----|--------|-----------|-------|----------|
| 2 | Linux | RedHat 2.4 | false | 16 |
| 2 | Linux | RedHat 2.4 | true | 40 |
| 1 | Windows | 2000 | true | 24 |

Based on the information in Tables 1 and 2, the information gain for the entity type Computer is automatically determined via the calculations presented below (see steps 306 and 308 of FIG. 3). Calculations for information gain for Computer entity type are presented below:

$H(\text{label}) = (64/80) * \log_2(80/64) + (16/80) * \log_2(80/16)$ (see equation (1))

$\text{Entropy}(P_1, N_1) = 0$ (see equation (2b))

$\text{Entropy}(P_2, N_2) = -((40/56) * \log_2(40/56) + (16/56) * \log_2(16/56)) = 0.8631$ (see equation (2b))

$\text{Gain}(\text{Computer}) = H(\text{label}) - ((24/80) * 0 + (56/80) * 0.8631) = 0.1177$ (see equation (3))

Using calculation similar to ones presented above for the Computer entity type, information gain values for all other entity types (i.e., HBA, Subsystem and Switch) in this example are automatically determined (see steps 306 and 308 of FIG. 3). The information gains for the entity types HBA, Subsystem, Computer and Switch are presented in Table 3 in order of their calculated information gain rankings (see step 202 of FIG. 2).

TABLE 3

| ENTITY CLASS | INFORMATION GAIN | RANKING |
|--------------|------------------|---------|
| HBA | 0.3219 | 1 |
| Subsystem | 0.2364 | 2 |
| Computer | 0.1177 | 3 |
| Switch | 0 | 4 |

Based on the information in Table 3, the top-ranked entity type (i.e., HBA entity type) is selected as the current entity type (see step 204 of FIG. 2) and the decision tree classification is applied on the HBA entity type (see step 206 of FIG. 2). The decision tree is unable to derive the correct classification for the SAN configuration problem, because a first classification accuracy resulting from step 206 (see FIG. 2), as applied to the HBA entity type, is less than a predetermined threshold value.

Next, the process of FIG. 2 joins the HBA entity type and the next-ranked entity type (i.e., Subsystem entity type, which is ranked second in Table 3) that is connected to the current entity type (see step 208 of FIG. 2). The joining of the HBA entity type and the Subsystem entity type generates a new table (i.e., a joined table) of attributes and attribute values associated with a first aggregate entity type (i.e., an aggregate of the HBA and Subsystem entity types) With this new table as input, the decision tree is able to classify the attribute and attribute value pairs and determine a second classification accuracy that exceeds the predetermined threshold (see steps 210 and 212 of FIG. 2) (i.e., the second classification accuracy exceeds the first classification accuracy).

The classification loop of FIG. 2 is iterated once again and the Computer entity type (i.e., the third ranked entity type in Table 3) is joined to the aggregate of the HBA and Subsystem entity types generated in the previous iteration of the classification loop to form a second aggregate entity type (see step 208 of FIG. 2). After joining the Computer entity type, the decision tree is applied to the second aggregate entity type and a third classification accuracy is determined (see step 210 of FIG. 2). Since the third classification accuracy does not exceed the second classification accuracy, then no further iterations of the classification loop are needed (see the No branch of step 212). The attributes and attribute values associated with the first aggregate entity type are identified as being in the optimal set 108 (see FIG. 1) (see step 214 of FIG. 2). The entities and any associations associated with the attributes are also identified as being included in the optimal set 108 (see FIG. 1) (see step 214 of FIG. 2). Best practices are generated in rules that state that the attributes and attribute values of the optimal set must be avoided (see step 216 of FIG. 2). The avoidance of the attributes and attribute values of the optimal set prevent a recurrence of the SAN configuration problem.

Computing System

Figure 5:
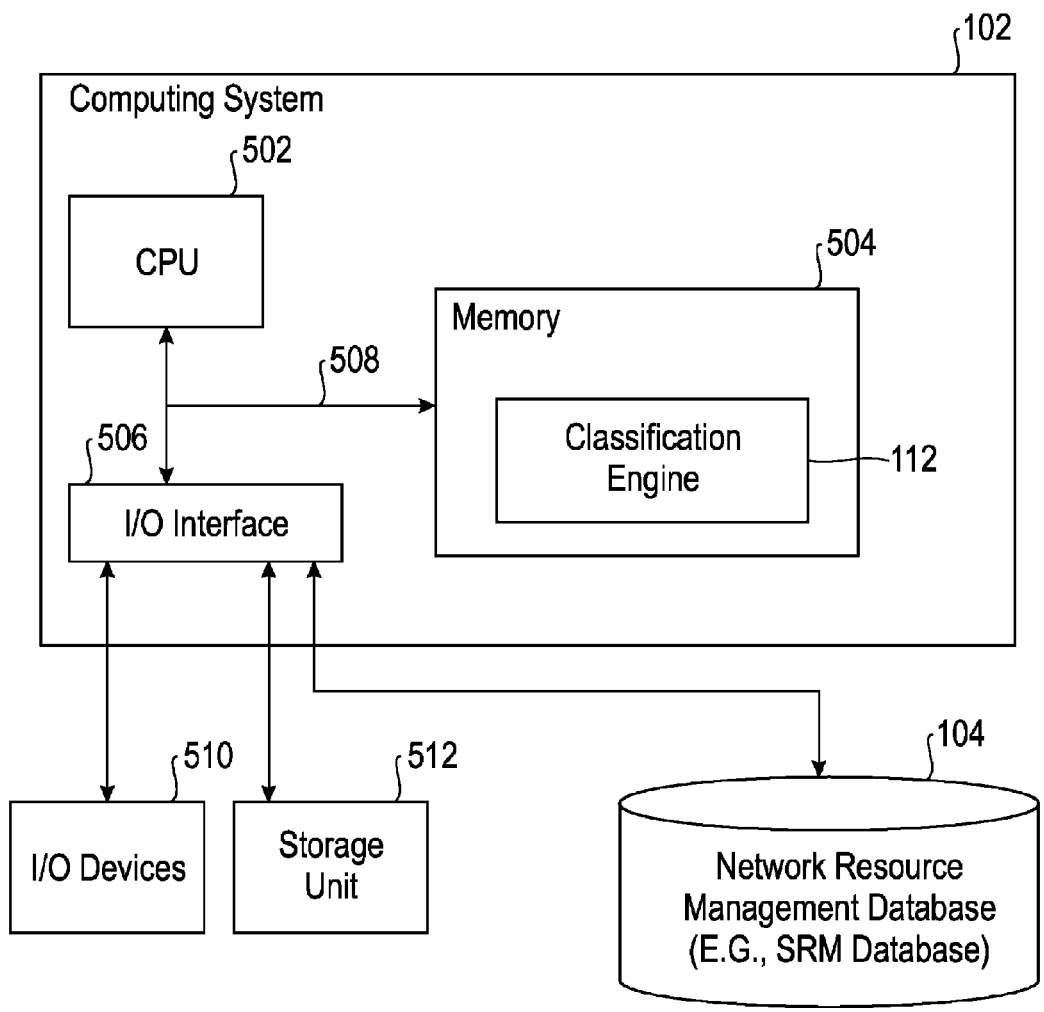
FIG. 5 is a block diagram of a computing system that is included in the system of FIG. 1 and that implements the processes of FIG. 2 and FIG. 3.

FIG. 5 is a block diagram of a computing system that is included in the system of FIG. 1 and that implements the processes of FIG. 2 and FIG. 3. Computing system 102 generally comprises a central processing unit (CPU) 502, a memory 504, an input/output (I/O) interface 506, and a bus 508. Computing system 102 is coupled to I/O devices 510, storage unit 512, and network resource management database 104. CPU 502 performs computation and control functions of computing system 102. CPU 502 may comprise a single processing unit, or be distributed across one or more processing units in one or more locations (e.g., on a client and server).

Memory 504 may comprise any known type of data storage and/or transmission media, including bulk storage, magnetic media, optical media, random access memory (RAM), read-only memory (ROM), a data cache, a data object, etc. Cache memory elements of memory 504 provide temporary storage of at least some program code in order to reduce the number of times code must be retrieved from bulk storage during execution. Storage unit 512 is, for example, a magnetic disk drive or an optical disk drive that stores data. Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including but not limited to a display monitor, keyboard, pointing device, speakers, handheld device, printer, facsimile, etc. I/O devices can be coupled to computing system 102 directly or through I/O interface 506. Bus 508 provides a communication link between each of the components in computing system 102, and may comprise any type of transmission link, including electrical, optical, wireless, etc.

I/O interface 506 also allows computing system 102 to store and retrieve information (e.g., program instructions or data) from an auxiliary storage device (e.g., storage unit 512). The auxiliary storage device may be a non-volatile storage device (e.g., a CD-ROM drive which receives a CD-ROM disk). Computing system 102 can store and retrieve information from other auxiliary storage devices (not shown), which can include a direct access storage device (DASD) (e.g., hard disk), a magneto-optical disk drive, a tape drive, or a wireless communication device.

Memory 504 includes classification engine 112 for automatically identifying an optimal set of attributes of entities to facilitate generating best practices for configuring a networked system. Further, memory 504 may include other systems not shown in FIG. 5, such as an operating system (e.g., Linux).

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for classification engine 112 for use by or in connection with a computing system 102 or any instruction execution system to provide and facilitate the capabilities of the invention. For the purposes of this description, a computer-usable or computer-readable medium can be any apparatus that can contain, store, communicate, propagate, or transport the program for use by or in connection with the instruction execution system, apparatus, or device.

The medium can be a system (or apparatus or device) that utilizes an electronic-based, magnetic-based, optical-based, electromagnetic-based, infrared-based, or semiconductor-based system (or apparatus or device). Examples of a computer-readable medium include a semiconductor or solid state memory, magnetic tape, a removable computer diskette, RAM, ROM, a rigid magnetic disk and an optical disk. Current examples of optical disks include compact disk read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically identifying an optimal set of attributes of entities to facilitate generating best practices for configuring a networked system, comprising:

ranking, by a computing system and based on a plurality of information gain values, a plurality of entity types of a plurality of entities included in said networked system;

determining, by said computing system and subsequent to said ranking, a first classification accuracy relative to a first entity type, wherein said first entity type is a highest ranked entity type of said plurality of entity types based on said ranking or is a first aggregate entity type associated with two or more entity types of said plurality of entity types;

selecting, by said computing system and subsequent to said determining said first measurement, a second entity type of said plurality of entity types, wherein said selecting is based on said ranking;

performing, by said computing system, a database join operation on a first set of one or more attributes of one or more entities of said first entity type and a second set of one or more attributes of one or more entities of said second entity type, wherein a result of said performing is a second aggregate entity type;

determining, by said computing system, a second classification accuracy relative to said second aggregate entity type;

determining, by said computing system, that said second classification accuracy is less than or equal to said first classification accuracy;

identifying, by said computing system and in response to said determining that said second measurement is less than or equal to said first measurement, an optimal set of one or more attributes as said first set of one or more attributes, wherein said optimal set contributes to a problem associated with said networked system; and storing said optimal set in a data repository coupled to said computing system.

2. The method of claim 1, further comprising generating a set of best practices for configuring said networked system to avoid said problem, wherein a configuration of said networked system that follows said set of best practices excludes any entity having said optimal set of one or more attributes.

3. The method of claim 1, wherein said ranking said plurality of entity types comprises determining an information entropy value $$H(T) \text{ as } \sum_{j=1}^{n} p(j) \log_2 \left( \frac{1}{p(j)} \right),$$

wherein T is an entity type of said plurality of entity types, wherein p(j) is a probability of an occurrence of an outcome j of T, and wherein n is a total number of possible outcomes of T.

4. The method of claim 3, wherein said ranking said plurality of entity types further comprises:

identifying a set of entities that report said problem, wherein said set of entities is included in said plurality of entities;

determining, subsequent to said identifying said set of entities, P true data paths that are internal to said set of entities, wherein $P_i$ true data paths of said P true data paths are included in an i-th partition of k partitions of a configuration of said networked system, and wherein k>1;

determining, subsequent to said identifying said set of entities, N false data paths that are external to said set of entities, wherein $N_i$ false data paths of said N false data paths are included in said i-th partition of said configuration; and determining an entropy value Entropy($P_i$,$N_i$) as $$-\left(\frac{P_i}{P_i+N_i} \times \log_2 \frac{P_i}{P_i+N_i} + \frac{N_i}{P_i+N_i} \times \log_2 \frac{N_i}{P_i+N_i}\right).$$

5. The method of claim 4, wherein said ranking said plurality of entity types further comprises:

determining an information gain value Gain(T) of said plurality of information gain values as $$H(T) - \sum_{i=1}^{k} \frac{P_i+N_i}{P+N} \times \text{Entropy}(P_i, N_i),$$

wherein Gain(T) indicates an information gain of said entity type T; and ordering said entity type T relative to one or more other entity types of said plurality of entity types based on Gain(T).

6. The method of claim 1, wherein said determining said first classification accuracy includes applying a decision tree algorithm on said first entity type, and wherein said determining said second classification accuracy includes applying said decision tree algorithm on said second aggregate entity type.

7. The method of claim 1, wherein said first entity type is said first aggregate entity type and wherein said method further comprises performing, by said computing system, prior to said determining said first measurement and in an order determined by said ranking, said database join operation recursively on n sets of one or more attributes associated with n entity types of said plurality of entity types in a one-to-one correspondence, wherein a result of said performing said database join operation recursively on said n sets of one or more attributes is said first aggregate entity type.

8. The method of claim 7, wherein said selecting said second entity type includes determining that a rank of said second entity type is lower than n ranks associated with said n entity types, and wherein said rank and said n ranks are determined by said ranking.

9. The method of claim 1, wherein said first entity type is said highest ranked entity type, and wherein said selecting said second entity type includes determining that a rank of said second entity type is a next highest ranked entity type of said plurality of entity types based on said ranking.

10. The method of claim 1, wherein said networked system includes a storage area network.

11. A computing system comprising a processor and a computer-readable memory unit coupled to said processor, said memory unit containing instructions that when executed by said processor implement a method of automatically identifying an optimal set of attributes of entities to facilitate generating best practices for configuring a networked system, wherein said method comprises:

ranking, based on a plurality of information gain values, a plurality of entity types of a plurality of entities included in said networked system;

determining, subsequent to said ranking, a first classification accuracy relative to a first entity type, wherein said first entity type is a highest ranked entity type of said plurality of entity types based on said ranking or is a first aggregate entity type associated with two or more entity types of said plurality of entity types;

selecting, subsequent to said determining said first measurement, a second entity type of said plurality of entity types, wherein said selecting is based on said ranking;

performing a database join operation on a first set of one or more attributes of one or more entities of said first entity type and a second set of one or more attributes of one or more entities of said second entity type, wherein a result of said performing is a second aggregate entity type;

determining a second classification accuracy relative to said second aggregate entity type;

determining that said second classification accuracy is less than or equal to said first classification accuracy;

identifying, in response to said determining that said second measurement is less than or equal to said first measurement, an optimal set of one or more attributes as said first set of one or more attributes, wherein said optimal set contributes to a problem associated with said networked system; and storing said optimal set in a data repository coupled to said computing system.

12. The system of claim 11, wherein said method further comprises generating a set of best practices for configuring said networked system to avoid said problem, wherein a configuration of said networked system that follows said set of best practices excludes any entity having said optimal set of one or more attributes.

13. The system of claim 11, wherein said ranking said plurality of entity types comprises determining an information entropy value $$H(T) \text{ as } \sum_{j=1}^{n} p(j) \log_2\left(\frac{1}{p(j)}\right),$$

wherein T is an entity type of said plurality of entity types, wherein p(j) is a probability of an occurrence of an outcome j of T, and wherein n is a total number of possible outcomes of T.

14. The system of claim 13, wherein said ranking said plurality of entity types further comprises:

identifying a set of entities that report said problem, wherein said set of entities is included in said plurality of entities;

determining, subsequent to said identifying said set of entities, P true data paths that are internal to said set of entities, wherein $P_i$ true data paths of said P true data paths are included in an i-th partition of k partitions of a configuration of said networked system, and wherein k>1;

determining, subsequent to said identifying said set of entities, N false data paths that are external to said set of entities, wherein $N_i$ false data paths of said N false data paths are included in said i-th partition of said configuration; and determining an entropy value Entropy($P_i$,$N_i$) as $$-\left(\frac{P_i}{P_i+N_i} \times \log_2 \frac{P_i}{P_i+N_i} + \frac{N_i}{P_i+N_i} \times \log_2 \frac{N_i}{P_i+N_i}\right).$$

15. The system of claim 14, wherein said ranking said plurality of entity types further comprises:
determining an information gain value Gain(T) of said plurality of information gain values as $$H(T) - \sum_{i=1}^{k} \frac{P_i + N_i}{P + N} \times \text{Entropy}(P_i, N_i),$$

wherein Gain(T) indicates an information gain of said entity type T; and
ordering said entity type T relative to one or more other entity types of said plurality of entity types based on Gain(T).

16. A computer program product, comprising a computer non-transitory storage medium having a computer readable program code embodied therein, said computer readable program code containing instructions that when executed by a processor of a computing system implement a method of automatically identifying an optimal set of attributes of entities to facilitate generating best practices for configuring a networked system, said method comprising:
ranking, based on a plurality of information gain values, a plurality of entity types of a plurality of entities included in said networked system;
determining, subsequent to said ranking, a first classification accuracy relative to a first entity type, wherein said first entity type is a highest ranked entity type of said plurality of entity types based on said ranking or is a first aggregate entity type associated with two or more entity types of said plurality of entity types;
selecting, subsequent to said determining said first measurement, a second entity type of said plurality of entity types, wherein said selecting is based on said ranking;
performing a database join operation on a first set of one or more attributes of one or more entities of said first entity type and a second set of one or more attributes of one or more entities of said second entity type, wherein a result of said performing is a second aggregate entity type;
determining a second classification accuracy relative to said second aggregate entity type;
determining that said second classification accuracy is less than or equal to said first classification accuracy;
identifying, in response to said determining that said second measurement is less than or equal to said first measurement, an optimal set of one or more attributes as said first set of one or more attributes, wherein said optimal set contributes to a problem associated with said networked system; and
storing said optimal set in a data repository coupled to said computing system.

17. The program product of claim 16, wherein said method further comprises generating a set of best practices for configuring said networked system to avoid said problem, wherein a configuration of said networked system that follows said set of best practices excludes any entity having said optimal set of one or more attributes.

18. The program product of claim 16, wherein said ranking said plurality of entity types comprises determining an information entropy value $$H(T) \text{ as } \sum_{j=1}^{n} p(j) \log_2 \left( \frac{1}{p(j)} \right),$$

wherein T is an entity type of said plurality of entity types, wherein p(j) is a probability of an occurrence of an outcome j of T, and wherein n is a total number of possible outcomes of T.

19. The program product of claim 18, wherein said ranking said plurality of entity types further comprises:
identifying a set of entities that report said problem, wherein said set of entities is included in said plurality of entities;
determining, subsequent to said identifying said set of entities, P true data paths that are internal to said set of entities, wherein $P_i$ true data paths of said P true data paths are included in an i-th partition of k partitions of a configuration of said networked system, and wherein k>1;
determining, subsequent to said identifying said set of entities, N false data paths that are external to said set of entities, wherein $N_i$ false data paths of said N false data paths are included in said i-th partition of said configuration; and
determining an entropy value Entropy($P_i$,$N_i$) as $$-\left( \frac{P_i}{P_i + N_i} \times \log_2 \frac{P_i}{P_i + N_i} + \frac{N_i}{P_i + N_i} \times \log_2 \frac{N_i}{P_i + N_i} \right).$$

20. The program product of claim 19, wherein said ranking said plurality of entity types further comprises:
determining an information gain value Gain(T) of said plurality of information gain values as $$H(T) - \sum_{i=1}^{k} \frac{P_i + N_i}{P + N} \times \text{Entropy}(P_i, N_i),$$

wherein Gain(T) indicates an information gain of said entity type T; and
ordering said entity type T relative to one or more other entity types of said plurality of entity types based on Gain(T).

* * * * *